Patented Aug. 18, 1953

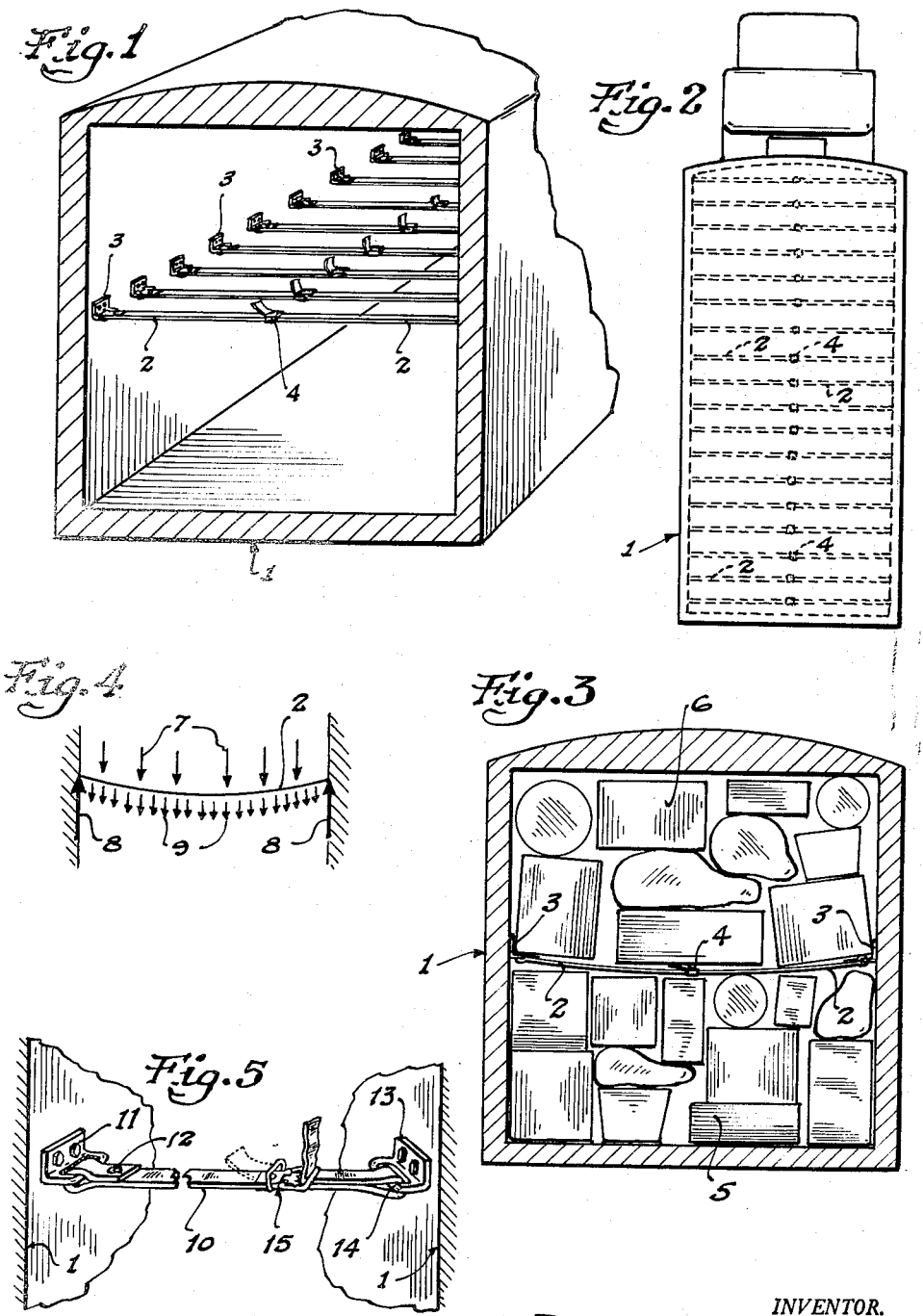

2,649,054

UNITED STATES PATENT OFFICE 2,649,054

TRUCK LOADING

Dean E. Rueckert, Mokema, Ill., assignor to Swift & Company, Chicago, Ill., a corporation of Illinois Application October 12, 1949, Serial No. 120,963

4 Claims. (Cl. 105—370)

This invention relates to a method and means for loading cargo vehicles and more particularly to a method for loading such vehicles with relatively flexible containers and a means for carrying out such a method.

In the transportation of relatively bulky, frangible or flexible containers, such as cardboard or paper boxes, containing meat products or other nonrigid products, the problem of damage due to overloading is ever present. Taking, for example, meat products packaged in corrugated cardboard containers, it is not unusual to find a relatively large percentage of a shipment damaged to some extent after even a short haul in a motor truck or the like. The primary cause of such damage is that the weight of the containers and the products contained therein becomes very great when the truck is loaded to full capacity. Those containers which are on the bottom levels of the load take the brunt of the weight, and since the products contained therein are nonrigid and deformable under pressure, the frangible or flexible walls of the said lower containers are broken, pushed in, deformed, or otherwise damaged with a resultant loss in damaged product and in the sales appeal of the containers themselves.

It has been proposed in the past to utilize "dunnage," loose boards, racks, or the like to separate the load into sections and thereby distribute some of the weight. However, this system has several inherent disadvantages. In the first instance, this "dunnage" method requires that a supply of bulky materials, such as boards and the like, be kept at the loading docks or on the trucks where it is in the way and takes up considerable valuable space. The use of dunnage involves the serious problem of temporarily storing it out of the way during the unloading process. Secondly, in placing the dunnage on the load, there is the danger that the edges of the boards or the like will rip into the containers and effect as much damage as would the weight without the dunnage. The use of rigid dunnage usually reduces the pay load because of weight as well as bulk thereof. Finally, and probably most important from an economical standpoint, the use of dunnage ties up racks, boards, and the like which have valuable uses elsewhere, and in addition, due to constant breakage, the dunnage must be often replaced. This method has proven to be both inefficient and expensive, but has been almost universally resorted to in the past as the best-known method for preventing the aforementioned weight damage to the lower sections of loads composed of relatively frangible containers.

An obvious solution to the problem would seem to be not to load the trucks to such a capacity that the weight would damage the lower containers of the load. However, in order to get maximum efficiency and low trucking costs, shippers find it necessary to load trucks to full capacity and take their chances with weight breakage.

It is therefore an object of this invention to provide a method for loading relatively flexible containers wherein damage due to weight breakage is minimized.

It is a further object of this invention to provide a method for loading relatively flexible containers whereby the maximum capacity of the vehicle is utilized and the containers are maintained in undamaged condition.

It is an additional object of this invention to provide a method for loading relatively flexible containers which overcomes the disadvantages of the prior art methods set forth above.

It is a further object of this invention to provide a means for carrying out the improved method of loading of this invention whereby the weight of the upper portion of a load is so distributed as to substantially eliminate damage therefrom to the lower portion of the load.

It is an additional object of this invention to provide a resilient, load-relieving means positioned between the upper and lower portions of a load of relatively flexible containers or the like whereby weight damage to the lower portion of the load is substantially eliminated.

It is a further object of this invention to provide a load composed of relatively flexible containers, said load being capable of withstanding severe shocks without damage to the lower portion thereof through weight stress.

Additional objects, if not specifically set forth herein, will be apparent to one skilled in the art from the following detailed description of this invention.

Generally, the present invention contemplates dividing the load into two approximately equal portions by means of a flexible, resilient, tensionally-mounted platform extending between the upper and lower portions of the load, said platform being supported by the side walls of the vehicle body. More specifically, the preferred form of the platform used to divide the load into two portions comprises a plurality of transverse straps, made of any suitable material, affixed to each side of the vehicle body, each strap being in the same horizontal plane and spaced about 12 inches from one another longitudinally of the truck body. It is believed that the drawings will serve to clarify both the method and the preferred means for carrying it out.

In the drawings:

Figure 1 depicts a conventional truck or trailer body equipped with means for carrying out the methods of this invention.

Figure 2 is a top view of a truck-trailer showing the spacing between the load-relieving straps of this invention, Figure 3 is an end view of a vehicle body loaded in accordance with the method of the present invention, Figure 4 represents a graphic picture of the manner in which the method of this invention relieves and distributes the weight load on the lower portion of the cargo, and Figure 5 illustrates a modification in the manner of applying tension to the straps used to carry out the method of this invention.

Referring now to Figure 1, there is shown a truck or trailer cargo body 1. For the purpose of clarity in illustrating the invention, the body is here shown empty. 2 represents straps of leather, fabric, flexible metal, or the like mounted opposite each other and spaced longitudinally of the body, said straps being affixed at one end thereof to the side of body 1 by suitable brackets or the like 3. These straps as herein illustrated are sufficiently long to extend slightly over halfway across the body 1. The straps on the left-hand side of the body are shown as equipped with a buckle 4, adapted to engage and hold in tension the companion straps from the right-hand side of the body.

As clearly shown in Figure 2, the straps are so spaced in the truck body as to, in effect, form a resilient, tensionally-mounted platform extending the length of the said body. Preferably the straps are spaced about 12 inches apart so as to prevent relatively small containers from slipping between them.

Figure 3 shows an end view of a truck or trailer body 1 loaded in accordance with the method of the present invention and utilizing the means pictured in Figures 1 and 2 for carrying out such method. 5 represents various odd-shaped containers of cardboard or other relatively frangible material piled one atop the other to form the lower portion of the load. This lower portion of the load is built up to a height just below the strap brackets 3. Then the load-relieving straps 2 are tensionally secured together by means of the buckles 4 and other containers 6 piled atop the straps to make up the upper portion of the load. The weight of containers 6 causes the straps 2 to deflect so that the straps rest atop the lower portion of the load on top of containers 5. These straps, due to their tensional mounting, take up a considerable amount of the stress applied by the load on top thereof and distribute it to the brackets and thence to the walls of the body 1.

In loading a vehicle in accordance with the present invention, the load-relieving straps will be successively placed in position as the lower portion of the load is made up and the upper portion of the load placed on top of each section of the straps as they are positioned so that the complete load is progressively built up in sections from the rear of the cargo body to the open end thereof.

Figure 4 illustrates graphically the result obtained by loading in accordance with the method of this invention. The force vectors or arrows are not drawn to scale and are for purposes of illustration only. It can be seen that the load above the load-relieving straps 2 applies relatively great force to the straps, as shown by the length of the vectors 7. Due to the tensional mounting of the strap 2, as the said strap is deflected downwardly by the weight illustrated by 7, a great portion of this stress is transferred to the supporting walls of the truck where it is pictorially represented by vectors 8. The remaining weight is transmitted through the straps to that portion of the load contained beneath such straps, but is so diminished, as shown by vectors 9, as to materially reduce the danger of crushing the lower portion of the load.

Figure 5 illustrates one of the many modifications which may be made in the means for carrying out the method of this invention. Shown in this drawing is a strap 10 fixedly mounted at one end to a bracket 11 by means of a bolt 12. This strap is of greater length than the width of the body 1 and is fastened thereacross by passing the free end of the strap through bracket 13 and over bar 14. By this means sufficient force can be applied to the strap to positively tension the same, and the strap may then be secured in such tensioned condition by buckle 15, affixed to strap 10.

As can be seen from the above discussion, the method of this invention essentially comprises three steps:

1. Placing a portion of the load in the base of the truck;

2. Providing a tensionally-mounted platform of straps or the like above such lower portion;

3. Placing the remaining portion of the load atop the said tensionally-mounted platform.

It is obvious that many modifications and variations of the invention as hereinbefore set forth may be made without departing materially from the spirit and scope thereof. For example, the straps used to form the tensionally-mounted platform may be made vertically adjustable so as to permit a wider latitude in the positioning of the said platform. Likewise, other means of fastening and tensioning the straps than those illustrated herein could obviously be used.

The loading method and means which form the subject matter of the present invention successively overcome the disadvantages of the prior art loading methods. This method permits of full capacity loading without danger of damage to the lower portions of the load. It does away with the necessity of carrying dunnage about on the trucks or of storing such dunnage at the loading dock. The resilient, load-relieving straps take up practically no space in the loaded trucks, in contrast to rigid racks, dunnage, or the like, since they are deformed to conform to a considerable degree to the contours of the lower portion of the load. As pointed out in the previous discussion and as illustrated in Figure 4, this method distributes the weight of the upper portion of the load to a large extent to the side walls of the vehicle body and away from the lower portion of the load. Even should the vehicle body be of relatively light construction, it has been found that the upper portion of the load tends to resist any bowing or bending of the sides by providing support to the said sides with which it is in contact, as can be seen in Figure 3. Further, by the provision of a resilient, tensionally-mounted, load-relieving means, a certain amount of "give" or flexibility is imparted to the load whereby the load, and particularly the lower portion thereof, may better withstand a severe bump or jar caused by the vehicle hitting a rut, curb, or the like without crushing or damaging the individual containers or products making up the load.

The present invention is applicable to the loading of any product or commodity which is packaged in easily deformable containers or which is susceptible to crushing when loaded in the conventional manner without the use of dunnage or the like. It may obviously be applied to the loading of any commodity whether deformable or not, but, as previously pointed out, it finds particular applicability when applied to the loading and transportation of goods susceptible to crushing. It is not intended to restrict the invention to any particular type of body, but it is considered applicable to loading stake-body trucks, refrigerated trucks, closed-body trucks, and refrigerated and nonrefrigerated trailers or the like.

I claim:

1. Means for distributing a substantial proportion of the vertical weight stress exerted by a superimposed portion of the vehicle load to the vehicle side walls comprising: a plurality of flexible straps spaced at substantial intervals longitudinally of said vehicle body side walls and affixed thereto at points equidistant from the vehicle body floor, said straps extending transversely of said vehicle body so as to form a horizontal platform parallel to said floor; means for positively applying tension solely in a horizontal plane to each of said straps individually; and means for securing such straps in such individually-tensioned condition whereby to assume a part of the vertical weight stress of the superimposed load.

2. A method of loading a vehicle body open at one end only which comprises: securing to the side walls of said vehicle body a plurality of flexible straps spaced at substantial intervals longitudinally thereof at points on said side walls equidistant from the vehicle body floor whereby said straps extend transversely of said vehicle body so as to form a horizontal platform parallel to said floor; placing a plurality of relatively flexible containers within and adjacent the closed end of said vehicle body beneath said horizontal platform; placing a plurality of containers within and adjacent the closed end of said vehicle body so as to be supported by the flexible platform; adjusting the horizontal tension exerted on each of said flexible straps so that the vertical weight stress of the superimposed containers is partially assumed by said flexible platform and distributed to the vehicle side walls and partially assumed by the containers beneath the platform; and repeating this procedure from the closed to the open end of the vehicle body.

3. A load, comprising the combination of a vehicle body; a plurality of flexible containers and a plurality of flexible straps spaced at substantial intervals longitudinally of said vehicle body side walls and affixed thereto at points equidistant from the vehicle body floor, said straps extending transversely of said vehicle body so as to form a platform parallel to said floor, each of said straps being horizontally tensionable, said platform subdividing the containers into a lower portion, supported by the floor of said vehicle body and an upper portion, the vertical weight stress of which is transmitted in part to the vehicle body side walls by said platform, and in part to the containers which form the lower portion of the load.

4. In a vehicle body adapted to transporting goods, the combination of a plurality of spaced, flexible, vertical stress-relieving members affixed to said vehicle side walls, positioned longitudinally in and extending transversely of the said vehicle body and means for positively applying tension to each of said members to form a flexible, load-supporting horizontal platform within said body in a plane parallel to the floor of said vehicle body.

DEAN E. RUECKERT.

References Cited in the file of this patent

UNITED STATES PATENTS

| Number | Name | Date |
| --- | --- | --- |
| 104,485 | Morse | June 21, 1870 |
| 254,630 | Farrar | Mar. 7, 1882 |
| 876,887 | Shires | Jan. 14, 1908 |
| 1,247,230 | Daly | Nov. 20, 1917 |
| 2,051,381 | Kivlin | Aug. 18, 1936 |
| 2,056,704 | Anderson | Oct. 6, 1936 |
| 2,226,667 | Love | Dec. 31, 1940 |
| 2,354,861 | Hermann | Aug. 1, 1944 |
| 2,490,434 | Harris | Dec. 6, 1949 |